United States Patent
Niermeyer et al.

(10) Patent No.: US 7,037,424 B2
(45) Date of Patent: *May 2, 2006

(54) CONNECTOR APPARATUS AND SYSTEM INCLUDING CONNECTOR APPARATUS

(75) Inventors: J. Karl Niermeyer, Tyngsboro, MA (US); Gastón de los Reyes, Boston, MA (US); Christopher R. Wargo, Wellesley, MA (US); Richard L. Miller, Needham, MA (US); Stephen K. Guerrera, Holliston, MA (US)

(73) Assignee: Mykrolis Corporation, Billerica, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/045,726

(22) Filed: Jan. 28, 2005

(65) Prior Publication Data

US 2005/0126985 A1    Jun. 16, 2005

Related U.S. Application Data

(60) Division of application No. 10/440,458, filed on May 16, 2003, which is a continuation of application No. 10/079,360, filed on Feb. 20, 2002, which is a division of application No. 09/113,837, filed on Jul. 10, 1998, now Pat. No. 6,378,907, which is a continuation-in-part of application No. 08/678,795, filed on Jul. 12, 1996, now Pat. No. 6,068,770.

(51) Int. Cl.
    *B01D 63/00*    (2006.01)

(52) U.S. Cl. .................. 210/321.6; 210/450; 210/456; 210/433.1; 210/321.8; 210/447; 285/26; 285/124.1

(58) Field of Classification Search .................. 285/26, 285/29, 124.1, 124.2, 124.3, 124.4, 125.1, 285/126.1, 129.1; 210/321.6, 321.75, 321.8, 210/443.1, 447, 450, 456, 433.1
See application file for complete search history.

(56) References Cited

U.S. PATENT DOCUMENTS

| 136,631 A | 3/1873 | Westinghouse |
| 420,209 A | 1/1890 | Nilson |
| 468,390 A | 2/1892 | Westerman |
| 872,174 A | 11/1907 | Fyock et al. |
| 872,707 A | 12/1907 | Beahm |
| 891,718 A | 6/1908 | McMillan |
| 898,214 A | 9/1908 | Gold |
| 940,334 A | 11/1909 | Leftwich |
| 967,516 A | 8/1910 | Harrison |
| 1,070,110 A | 8/1913 | Brown |

(Continued)

FOREIGN PATENT DOCUMENTS

DE    3100564 A1    8/1982

(Continued)

OTHER PUBLICATIONS

Allowable claims in U.S. Appl. No. 10/440,458.*

(Continued)

*Primary Examiner*—James M. Hewitt
(74) *Attorney, Agent, or Firm*—Hamilton, Brook, Smith & Reynolds, P.C.

(57) ABSTRACT

A connector apparatus is provided which is configured to replace a separation module in a system for dispensing a fluid. When it is desired to purge the system of a dispensed fluid, the connector apparatus, having the same configuration of an inlet and an outlet as the separation module, replaces the separation module and a purging fluid is passed through the system.

17 Claims, 6 Drawing Sheets

U.S. PATENT DOCUMENTS

| | | | |
|---|---|---|---|
| 1,186,068 | A | 6/1916 | Benjamin |
| 1,221,682 | A | 4/1917 | Coffield |
| 1,389,012 | A | 8/1921 | Roberts |
| 1,786,066 | A | 12/1930 | Hermann |
| 1,886,398 | A | 11/1932 | Harrell |
| 2,997,180 | A | 8/1961 | Loveday |
| 3,052,863 | A | 9/1962 | Uberbacher et al. |
| 3,107,601 | A | 10/1963 | Longmire |
| 3,214,195 | A | 10/1965 | Zahuranec et al. |
| 3,399,776 | A | 9/1968 | Knuth |
| 3,469,863 | A | 9/1969 | Riester et al. |
| 3,485,516 | A | 12/1969 | Keller et al. |
| 3,493,115 | A | 2/1970 | Koches |
| 3,519,133 | A | 7/1970 | Broering |
| 3,560,377 | A | 2/1971 | Loeffler |
| 3,628,662 | A | 12/1971 | Kudlaty |
| 3,706,184 | A | 12/1972 | Tucker |
| 3,727,764 | A | 4/1973 | Ogden |
| 3,734,851 | A * | 5/1973 | Matsumara ............... 210/632 |
| 3,802,564 | A | 4/1974 | Turman |
| 3,812,659 | A | 5/1974 | Westergren et al. |
| 3,935,106 | A | 1/1976 | Lipner |
| 3,947,080 | A | 3/1976 | Ege |
| 3,950,251 | A | 4/1976 | Hiller |
| 4,089,549 | A | 5/1978 | Vyse et al. |
| 4,174,231 | A | 11/1979 | Hobgood |
| 4,269,219 | A | 5/1981 | Dybvig |
| 4,283,284 | A | 8/1981 | Schnell |
| 4,298,358 | A | 11/1981 | Ruschke |
| 4,321,911 | A | 3/1982 | Offutt |
| 4,344,777 | A | 8/1982 | Siposs |
| 4,404,103 | A | 9/1983 | Drath |
| 4,411,783 | A | 10/1983 | Dickens et al. |
| 4,416,775 | A | 11/1983 | Halbich et al. |
| 4,494,775 | A | 1/1985 | Nash et al. |
| 4,498,989 | A | 2/1985 | Miyakawa et al. |
| 4,500,426 | A * | 2/1985 | Ishii et al. ............ 210/321.73 |
| 4,522,717 | A | 6/1985 | Brust |
| 4,524,807 | A | 6/1985 | Toliusis |
| 4,529,512 | A | 7/1985 | Williamson et al. |
| 4,535,997 | A | 8/1985 | Brust |
| 4,555,130 | A | 11/1985 | McClain |
| 4,559,136 | A | 12/1985 | Dockery |
| 4,568,456 | A * | 2/1986 | van Zon ................ 210/321.89 |
| 4,610,781 | A | 9/1986 | Bilstad et al. |
| 4,629,563 | A | 12/1986 | Wrasidlo |
| 4,636,307 | A | 1/1987 | Inoue et al. |
| 4,654,142 | A | 3/1987 | Thomsen et al. |
| 4,664,420 | A | 5/1987 | Demeri |
| 4,698,154 | A | 10/1987 | Mohn et al. |
| 4,719,012 | A | 1/1988 | Groezinger et al. |
| 4,735,716 | A | 4/1988 | Petrucci et al. |
| 4,759,571 | A | 7/1988 | Stone et al. |
| 4,806,240 | A | 2/1989 | Giordano et al. |
| 4,820,174 | A | 4/1989 | Farrar et al. |
| 4,846,800 | A | 7/1989 | Ouriel et al. |
| 4,857,189 | A | 8/1989 | Thomsen et al. |
| 4,857,191 | A | 8/1989 | Wolf |
| 4,861,476 | A | 8/1989 | Kohlheb et al. |
| 4,870,961 | A | 10/1989 | Barnard |
| 4,879,032 | A * | 11/1989 | Zemlin ................ 210/321.61 |
| 4,900,065 | A | 2/1990 | Houck |
| 4,900,449 | A | 2/1990 | Kraus et al. |
| 4,904,382 | A | 2/1990 | Thomsen |
| 4,932,987 | A | 6/1990 | Molina |
| 4,964,984 | A | 10/1990 | Reeder et al. |
| 4,966,699 | A * | 10/1990 | Sasaki et al. ............ 210/321.8 |
| 5,022,986 | A | 6/1991 | Lang |
| 5,041,220 | A | 8/1991 | Lee et al. |
| 5,057,131 | A | 10/1991 | Lackner et al. |
| 5,066,391 | A | 11/1991 | Faria |
| 5,069,780 | A | 12/1991 | Thalmann et al. |
| 5,076,925 | A | 12/1991 | Roesink et al. |
| 5,085,772 | A * | 2/1992 | Busch-Sorensen .......... 210/388 |
| 5,096,230 | A | 3/1992 | Bausch et al. |
| 5,108,598 | A | 4/1992 | Posner |
| 5,125,691 | A | 6/1992 | Bogdan |
| 5,133,858 | A | 7/1992 | Waltz et al. |
| 5,139,668 | A | 8/1992 | Pan et al. |
| 5,139,669 | A * | 8/1992 | Clermont et al. ......... 210/321.8 |
| 5,143,575 | A | 9/1992 | Glässel et al. |
| 5,160,042 | A * | 11/1992 | Bikson et al. ............ 210/321.8 |
| 5,160,615 | A * | 11/1992 | Takagi et al. ............ 210/321.8 |
| 5,167,814 | A | 12/1992 | Pulek |
| 5,167,837 | A | 12/1992 | Snodgrass et al. |
| 5,172,998 | A | 12/1992 | Hatagishi |
| 5,178,758 | A | 1/1993 | Hwang |
| 5,180,490 | A | 1/1993 | Eihusen et al. |
| 5,192,499 | A * | 3/1993 | Sakai et al. ................... 422/46 |
| 5,221,473 | A | 6/1993 | Burrows |
| 5,230,812 | A | 7/1993 | Williams |
| 5,262,068 | A | 11/1993 | Bowers et al. |
| 5,262,069 | A | 11/1993 | Kato |
| 5,316,347 | A | 5/1994 | Arosio |
| 5,324,483 | A | 6/1994 | Cody et al. |
| 5,341,832 | A | 8/1994 | Foust |
| 5,342,518 | A | 8/1994 | Posner et al. |
| 5,344,194 | A | 9/1994 | Hatagishi et al. |
| 5,373,595 | A | 12/1994 | Johnson et al. |
| 5,380,437 | A | 1/1995 | Bertoncini |
| 5,383,690 | A | 1/1995 | Niermeyer et al. |
| 5,387,339 | A | 2/1995 | Lee et al. |
| 5,389,260 | A | 2/1995 | Hemp et al. |
| 5,397,462 | A | 3/1995 | Higashijima et al. |
| 5,397,468 | A | 3/1995 | Chomka et al. |
| 5,399,263 | A | 3/1995 | Chomka et al. |
| 5,401,401 | A | 3/1995 | Hickok et al. |
| 5,413,711 | A | 5/1995 | Janik |
| 5,417,459 | A | 5/1995 | Gray et al. |
| 5,435,915 | A | 7/1995 | Connors, Jr. |
| 5,437,483 | A | 8/1995 | Umezawa |
| 5,449,454 | A | 9/1995 | Hickok |
| 5,453,184 | A | 9/1995 | Handtmann |
| 5,462,675 | A | 10/1995 | Hopkins et al. |
| 5,468,388 | A | 11/1995 | Goddard et al. |
| 5,468,390 | A | 11/1995 | Crivello et al. |
| 5,474,683 | A | 12/1995 | Bryant et al. |
| 5,478,119 | A | 12/1995 | Dye |
| 5,486,288 | A | 1/1996 | Stanford et al. |
| 5,505,842 | A | 4/1996 | Enderle |
| 5,507,530 | A | 4/1996 | Mahaney |
| 5,516,429 | A | 5/1996 | Snodgrass et al. |
| 5,525,225 | A | 6/1996 | Janik et al. |
| 5,558,371 | A | 9/1996 | Lordo |
| 5,601,710 | A | 2/1997 | Yoon et al. |
| 5,605,624 | A | 2/1997 | Wright |
| 5,620,599 | A * | 4/1997 | Hopkins et al. ............ 210/420 |
| 5,632,894 | A | 5/1997 | White et al. |
| 5,651,887 | A | 7/1997 | Posner et al. |
| 5,667,679 | A | 9/1997 | Bozenmayer et al. |
| 5,702,597 | A | 12/1997 | Chevallet et al. |
| 5,725,623 | A | 3/1998 | Bowerman et al. |
| 5,744,047 | A | 4/1998 | Gsell et al. |
| 5,762,787 | A | 6/1998 | Park et al. |
| 5,762,789 | A | 6/1998 | De los Reyes et al. |
| 5,779,903 | A | 7/1998 | Smith et al. |
| 5,782,791 | A | 7/1998 | Peterson et al. |
| 5,816,621 | A | 10/1998 | Frost |
| 5,824,217 | A * | 10/1998 | Pearl et al. ............ 210/321.75 |
| 5,842,724 | A | 12/1998 | Kozinski et al. |
| 5,842,888 | A | 12/1998 | Belopolsky |
| 5,858,224 | A | 1/1999 | Schwandt et al. |
| 5,911,879 | A | 6/1999 | Eybergen |
| 5,922,196 | A | 7/1999 | Baumann |

| | | | |
|---|---|---|---|
| 5,925,025 A | 7/1999 | Weilbacher et al. | |
| 5,927,759 A | 7/1999 | Hyslop | |
| 5,944,990 A * | 8/1999 | Edens | 210/232 |
| 5,951,862 A | 9/1999 | Bradford | |
| 5,984,371 A | 11/1999 | Mailleux | |
| 6,024,229 A | 2/2000 | Ayers | |
| D423,081 S | 4/2000 | Niermeyer | |
| 6,048,454 A | 4/2000 | Jenkins | |
| 6,059,318 A | 5/2000 | Estep et al. | |
| 6,059,797 A | 5/2000 | Mears | |
| 6,068,770 A | 5/2000 | Niermeyer et al. | |
| 6,139,738 A | 10/2000 | Maxwell | |
| 6,142,170 A | 11/2000 | Belfer et al. | |
| 6,159,366 A | 12/2000 | Carroll | |
| 6,176,904 B1 | 1/2001 | Gupta | |
| 6,251,270 B1 | 6/2001 | Blot-Carretero et al. | |
| 6,290,523 B1 | 9/2001 | Barnhart et al. | |
| 6,378,907 B1 | 4/2002 | Campbell et al. | |
| 6,387,271 B1 | 5/2002 | Geibel et al. | |
| 6,523,861 B1 | 2/2003 | Clancy et al. | |
| 6,547,284 B1 | 4/2003 | Rose et al. | |
| 6,581,974 B1 | 6/2003 | Ragner et al. | |
| 6,634,509 B1 | 10/2003 | Ochi | |
| 6,733,250 B1 | 5/2004 | Yajima | |
| 6,752,159 B1 | 6/2004 | Kavadeles et al. | |
| 6,840,548 B1 | 1/2005 | Lacroix | |
| 6,902,671 B1 | 6/2005 | Cappia et al. | |
| 2002/0060189 A1 | 5/2002 | Conrad | |
| 2002/0163187 A1 | 11/2002 | Pelfrey et al. | |

FOREIGN PATENT DOCUMENTS

| | | |
|---|---|---|
| DE | 29618092 U1 | 12/1996 |
| DE | 197 17 054 A 1 | 11/1998 |
| EP | 0 231 862 A2 | 8/1987 |
| EP | 0 269 054 A2 | 6/1988 |
| EP | 0390 715 A1 | 10/1990 |
| EP | 0 408 375 A2 | 1/1991 |
| EP | 0 492 627 A2 | 7/1992 |
| EP | 0 492 627 A3 | 7/1992 |
| EP | 0 535 546 A1 | 4/1993 |
| EP | 0 231 862 B1 | 5/1994 |
| EP | 0 616 826 A1 | 9/1994 |
| EP | 0 492 627 B1 | 6/1996 |
| EP | 0 815 928 A2 | 1/1998 |
| EP | 0 818 228 A1 | 1/1998 |
| EP | 0 887 100 A1 | 12/1998 |
| EP | 1 057 493 A2 | 12/2000 |
| FR | 2 633 368 A1 | 12/1989 |
| FR | 2 745 043 A1 | 8/1997 |
| GB | 344502 A | 12/1929 |
| GB | 2 137 110 A | 10/1984 |
| GB | 2 314 516 A | 1/1998 |
| JP | 56-122893 A | 2/1980 |
| JP | 57-27588 A | 7/1980 |
| JP | 61-119686 A | 7/1986 |
| JP | 62-234512 A | 10/1987 |
| JP | 7-17434 A | 1/1991 |
| JP | 3-115092 | 11/1991 |
| JP | 417805 | 2/1992 |
| JP | 4094705 | 3/1992 |
| JP | 52793 | 1/1993 |
| JP | 5-154200 | 6/1993 |
| JP | 5-154201 | 6/1993 |
| JP | 6-106164 A | 4/1994 |
| JP | 6-147383 | 5/1994 |
| JP | H6-39008 | 5/1994 |
| JP | 6042921 | 6/1994 |
| JP | 729003 | 4/1995 |
| JP | 7194905 A | 8/1995 |
| JP | 7232015 | 9/1995 |
| JP | 7110323 | 11/1995 |
| JP | 8024856 A | 1/1996 |
| JP | 8052465 | 2/1996 |
| JP | 10005746 A | 1/1998 |
| JP | 200077588 | 3/2000 |
| WO | WO93-16315 A1 | 8/1993 |
| WO | WO 01/64312 A1 | 9/2001 |
| WO | WO 02/22232 A1 | 3/2002 |
| WO | WO 03-022388 A2 | 3/2003 |

OTHER PUBLICATIONS

Pending claims in U.S. Appl. No. 10/440,459.*

Memorandum and Order dated Apr. 30, 2004, *Mykrolis Corporation v. Pall Corporation, United States District Court, District of Massachusetts* (Boston) Civil Docket #1:03-10392-GAO, pp. 1-22.

Clarke, Michael E., "Understanding the Operating Cycles of Mykrolis Two-Stage Technology Photochemical Dispense Systems," Mykrolis Applications Notes, Lit. No. MAL 111, Mar. 1999.

Clarke, Michael E., "Improving Photolithography Equipment OEE with the IMPACT®'ST Manifold," Mykrolis Applications Notes, Lit. No. MAL 109, Mar. 1999.

Clarke, Michael E., Cheng, Kwok-Shun, "New Photochemical Filtration Technology for Process Improvement," Paper presented at the INTERFACE '97 Poster Session, San Diego, California, Nov. 10, 1997.

Pall Corporation's Notification of Additional Highly Significant Prior Art Impacting the Validity of the Mykrolis Patents and Request for *Sua sponte* Dissolution of Preliminary Injunction, *Mykrolis v. Pall Corporation, United States District Court, District of Massachusetts* (Boston) Civil Docket No. 03-10392-GAO, dated Aug. 2, 2004.

Millipore Corporation, "Wafergard™ Photoresist Filtration System," pp. 1-9, (Jun., 1983).

Photograph of EZD-3 slotless retrofit manifold (slide-in version), Pall Production No. P011673, Oct. 26, 2004.

Photograph of EZD-3 slotless retrofit manifold (bolt-on version), Pall Production No. P011674, Oct. 26, 2004.

*Mykrolis Corporation: v. Pall Corporation, United States District Court, District of Massachusetts (Boston)*, Civil Action No. 03-10392-GAO, Memorandum and Order dated Jan. 12, 2005.

Photograph of Sumitomo Oxygen Concentrator for Medical Treatment Use, MO-2000, Feb. 1993 (along with an English-language translation).

Photographs of MO-2000 Medical Oxygen Generator, as sold beginning in Feb. 1993.

Statement of Kuzukiyo Takano, Oct. 20, 2004 (along with an English-language translation).

Colder Products Company, St. Paul, Minnesota, "CPC Quick Couplings for Plastic Tubing," Form CP-1, Rev. 2 990; 4 pages, Sep., 1990.

Colder Products Company, St. Paul, Minnesota, "CPC Quick Couplings and Fittings for Plastic Tubing," 3 pages, Sep., 1990.

*Mykrolis Corporation v. Pall Corporation, United States District Court, District of Massachusetts (Boston)* Civil Docket #1:03-cv-10392-GAO, pp. 1-11, Nov. 17, 2003.

Photoclean EZD, *Filtration of Photoresist, Organic Solvents, Developing Solution and Purified Water*,PALL, 1 page w/translation, Sep., 2, 1999.

Memorandum and Order dated Apr. 30, 2004, *Mykrolis Corporation v. Pall Corporation, United States District Court, District of Massachusetts* (Boston) Civil Docket #1:03-10392-GAO, pp. 1-22.

Clarke, Michael E., "Understanding the Operating Cycles of Mykrolis Two-Stage Technology Photochemical Dispense Systems," Mykrolis Applications Notes, Lit. No. MAL 111, Mar. 1999.

Clarke, Michael E., "Improving Photolithography Equipment OEE with the IMPACT® ST Manifold," Mykrolis Applications Notes, Lit. No. MAL 109, Mar. 1999.

Clarke, Michael E., Cheng, Kwok-Shun, "New Photochemical Filtration Technology for Process Improvement," Paper presented at the INTERFACE '97 Poster Session, San Diego, California, Nov. 10, 1997.

Exhibit 5, Pall's Preliminary Claim Chart Correlating Claim 3 of the '770 Patent to the Sumitomo '200 Publication, Aug., 2, 2004.

Exhibit 6, Pall's Preliminary Claim Chart Correlating Claim 1 of the '907 Patent to the Sumitomo '200 Publication, Aug. 2, 2004.

Exhibit 7, Pall's Preliminary Claim Chart Correlating Claim 3 of the '770 Patent to the Sumitomo '201 Publication, Aug. 2, 2004.

Pall Corporation's Notification of Additional Highly Significant Prior Art Impacting the Validity of the Mykrolis Patents and Request for *Sua sponte* Dissolution of Preliminary Injunction, *Mykrolis v. Pall Corporation, United States District Court, District of Massachusetts* (Boston) Civil Docket No. 03-10392-GAO, dated Aug. 2, 2004.

* cited by examiner

CONNECTOR APPARATUS AND SYSTEM INCLUDING CONNECTOR APPARATUS

RELATED APPLICATIONS

This application is a Divisional of U.S. Ser. No. 10/440,458, filed May 16, 2003, which is a Continuation application of U.S. Ser. No. 10/079,360, filed Feb. 20, 2002, which is a Divisional of 09/113,837 filed Jul. 10, 1998 (U.S. Pat. No. 6,378,907), which is a Continuation-in-Part of 08/678,795, filed Jul. 12, 1996 (U.S. Pat. No. 6,068,770), the entire teachings of all of which are hereby incorporated herein by reference.

BACKGROUND OF THE INVENTION

This invention relates to a connector apparatus for connecting elements of a fluid transfer system and to the system including the connector apparatus. Fluid separation devices having an easily replaceable and disposable fluid separation module have been used to control contamination in industrial processes for many years. Such devices are an integral part of the manufacture of many products including pharmaceuticals, food stuffs and beverages. However, nowhere is the need for effective contamination control greater than in the semiconductor fabrication industry. With circuit details in the submicron range and with further feature size reductions inevitable, the need for control of particulate, ionic, organic and other contaminants in semiconductor process fluids is essential. Also, because semiconductor devices are fabricated in clean rooms, it is important to minimize the potential of contaminating the manufacturing environment. For this reason, disposable fluid separation devices are preferable in semiconductor fabrication processes in order to minimize contamination of the process lines as well as the clean room.

Examples of semiconductor process fluids which are processed at the point of use (POU) include those chemicals used in photolithographic processing (photochemicals). Photochemicals include materials such as primers, adhesion promoters, photoresists, edge bead removers, antireflective coatings, developers, dielectrics, and the like. Such chemicals are commonly dispensed onto the silicon wafer by a specialized pump and subsequently dispersed into a uniform thin film using a process called spin coating. The purity of these chemicals at the POU is essential to producing acceptable product yields.

Fluid separation devices are in general of two types. In the first type, the separation element that includes a filter is a replaceable component, while the pressure vessel which houses the element, i.e., the housing, is reusable. The housing also contains appropriate fluid connections to the rest of the fluid processing system. Replacing the fluid separation element requires opening the housing, removing the separation element, installing the replacement separation element into the housing and closing the housing. There are many disadvantages to this type of fluid separation device. First, the replacement operation is time consuming, especially if access to the housing is restricted. Secondly, because the housing contains a quantity of the fluid being processed and because the fluid separation element is usually saturated with the fluid, spillage of the fluid usually occurs. In the case of hazardous fluids, spills can be a threat to the well-being of personnel in the area as well as potentially damaging to nearby equipment and facilities. Finally, the opening of the housing exposes the internal surfaces of the fluid processing system to unwanted contamination from the surrounding environment.

The second type of separation device is one in which the separation element is permanently attached to the housing, which also contains appropriate fluid connections to the rest of the fluid processing system, to form an integrated module. In this case, replacement involves disconnecting the entire separation module from the fluid processing system and reconnecting a replacement module to the system. In this manner replacement is easier, exposure of the operator to hazardous chemicals is minimized, the reliability of the connection is significantly improved, and contamination of the fluid processing system by the environment is reduced. The type of separation device is referred to as a disposable module, since the whole module is removed and disposed of whenever the separation element requires replacement regardless of what connector design is employed. Disposable modules usually require that multiple connections be made sequentially, a minimum of two connections, and more typically three or four. Threaded fasteners are cumbersome and sometimes difficult to engage; factors which involve the subsequent consumption of additional time and effort. Furthermore, the module has to be held in place while the connections are being made, which makes the connection event even more difficult since it requires performing two actions at the same time (i.e., holding the module in place and attaching each connector sequentially). Finally, in those applications in which the permanent connections to the fluid processing system are not rigid, as for example, when flexible tubing is used, liquid has a tendency to be discharged as the connections disengage. All of these problems exacerbate the time and effort required to replace a disposable module, in addition to still allowing for exposure of personnel to hazardous materials, and contamination of the manufacturing environment.

For these reasons, some disposable separation modules have been designed with features that allow them to be connected quickly and easily to the fluid processing system in a "quick-connect" fashion. These types of quick-connect modules provide for a set of connectors that sealingly engage with a single, simple stroke or action, to a mating set of connectors attached to a reusable substrate. Different types of mechanisms have been designed to accomplish quick-connect retention, all of which heretofore have required some form of relative motion between the male connector and its female counterpart, most commonly a twisting action.

Periodically, the fluid delivery systems utilizing a disposable separation module must be flushed of the liquid composition being delivered in order to prepare the system for delivery of another liquid composition. Since the separation module contains retentate from the initially processed liquid composition, it must be replaced during the flushing procedure. Also, because a separation module is an integral part of the fluid delivery system, one must be included in the system during flushing. The separation module utilized during the flushing procedure must be replaced after flushing since it contains retentate from the initial liquid composition removed from the system during the flushing step. This procedure is undesirable since the separation module is expensive.

Accordingly, it would be desirable to provide a means for flushing a liquid delivery system of processed liquid which does not require a separation module. In addition, it would be desirable to provide such a means which permits addition of a separation module to the system without otherwise changing the system.

SUMMARY OF THE INVENTION

The present invention provides a fluid separation apparatus comprising a separation module and a fluid connector member. The separation module includes a housing, a separation element contained within the housing, and a first set of at least three connectors on one end of the housing and being in fluid communication with the interior thereof. At least two of the connectors are for respectively introducing fluids to and withdrawing fluids from the interior of the housing, and at least one connector is a gas vent from the housing. The first set of at least three connectors is parallel and spaced apart from one another, and exclusive of one another. The fluid connector member includes a second set of at least three connectors, which are positioned and sized and shaped to engage in fluid tight engagement with the first set of connectors. The fluid tight engagement is effected through a first motion which, during the engagement, is substantially linear and parallel to the longitudinal axes of both the first and second sets of connectors.

The present invention also provides a system for purging a fluid from a fluid dispensing system which includes a feed pump, a dispensing pump and the connector apparatus of this invention.

DESCRIPTION OF SPECIFIC EMBODIMENTS

Figure 1:
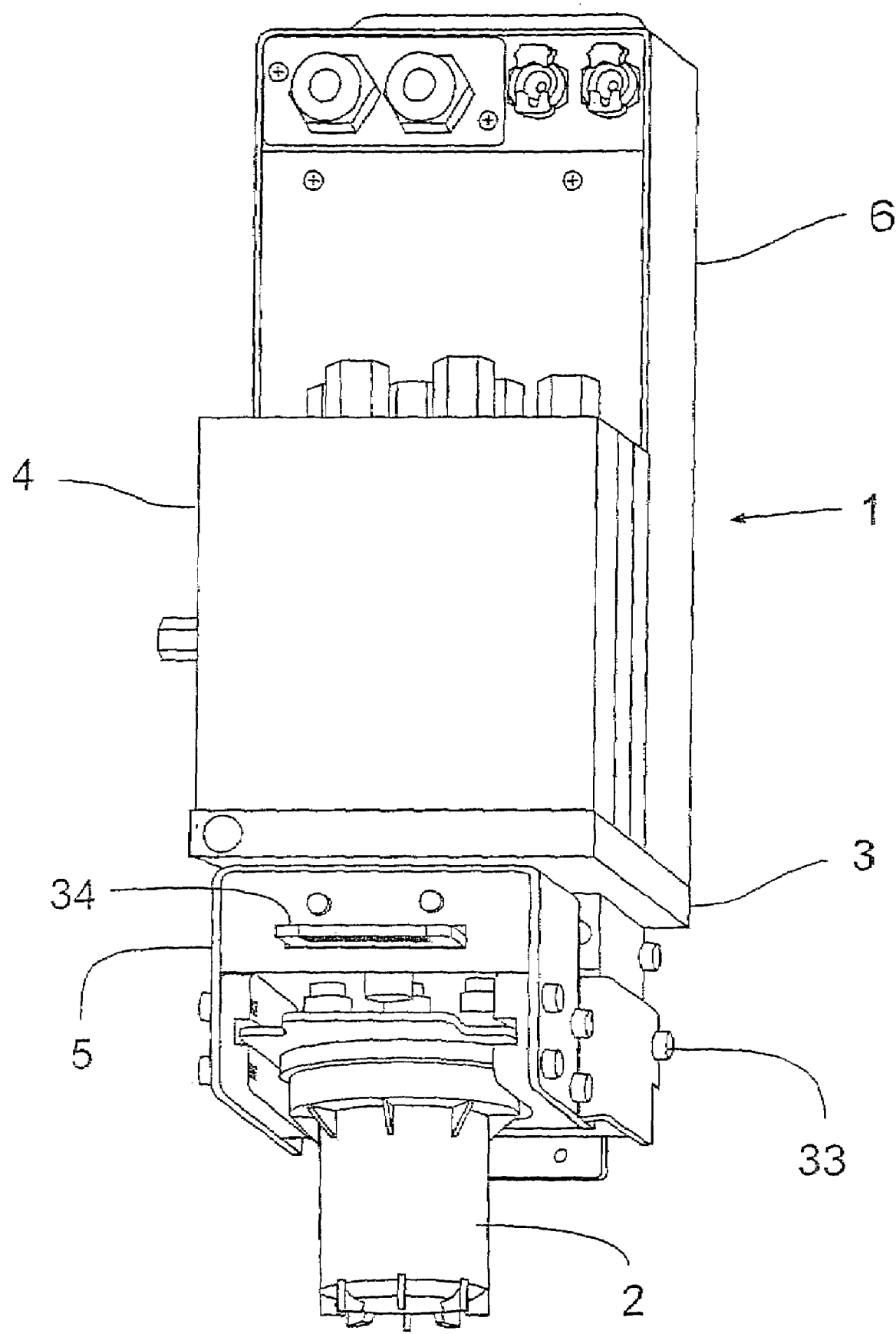
FIG. 1 is a perspective view of a fluid dispensing apparatus which includes a separation module.

This connector apparatus of this invention is useful for purging a fluid from a fluid dispensing system which includes a pump. The fluid dispensing system can include a single pump or a plurality of pumps such as a two pump system comprising a dispensing pump and a feed pump. Such a system, when dispensing a fluid includes a separation module having a separation element which separates unwanted components of the fluid from the fluid composition being dispensed. The connector apparatus of this invention replaces a separation module having a filter means by disconnecting the separation module from fluid inlet means and fluid outlet means of the module from conduits in the system which connect to the inlet means and the outlet means. The connector apparatus of this invention has the same configuration of inlets and outlets on its outer surface as on the outer surface of the separation module it replaces so that it is compatible with the remainder of the fluid dispensing system.

The present invention will be particularly described herein with reference to a two pump fluid dispensing system including a feed pump, a dispensing pump and a separation module having a particular configuration of inlet means and outlet means. However, it is to be understood that the present invention can be utilized in a fluid dispensing system having a separation module regardless of the outer surface configuration of inlet means and outlet means on the surface of the separation module. For example, the connector apparatus of this invention can be utilized to replace a filtration module including a filter and a filter housing as disclosed in U.S. Pat. Nos. 5,167,837 and 5,516,429 which are incorporated herein by reference. In addition, it is to be understood that the connector apparatus of this invention also is useful in a fluid dispensing system utilizing a single pump or more than two pumps.

The connector apparatus of this invention provides the substantial advantages of avoiding the need for a separation module including a separation element, when purging a fluid dispensing system. In addition, the volume capacity of the connector apparatus can be minimized to the volume needed to transport fluid therethrough so that the purge fluid needed for the system can be substantially less than the interior volume of the separation module.

An example of the application of this invention is in the point of use (POU) purification of photochemicals used in the microelectronics manufacturing industry. Photochemical dispense pumps and POU fluid separation devices are typically found in a drawer mounted beneath the spin coating apparatus. There are sometimes as many as eight pumps per drawer, severely limiting access to POU fluid separation devices which may be close-coupled to the dispense pumps to eliminate extraneous external plumbing and potential fluid contamination. Particularly suitable dispense pump and separation devices are those in which the pump and separation device form an integrated system as disclosed in U.S. Pat. No. 5,262,068 whose disclosure is incorporated by reference. User-friendly separation modules capable of being connected in a quick-connect fashion would be preferable in this application.

Figure 2:
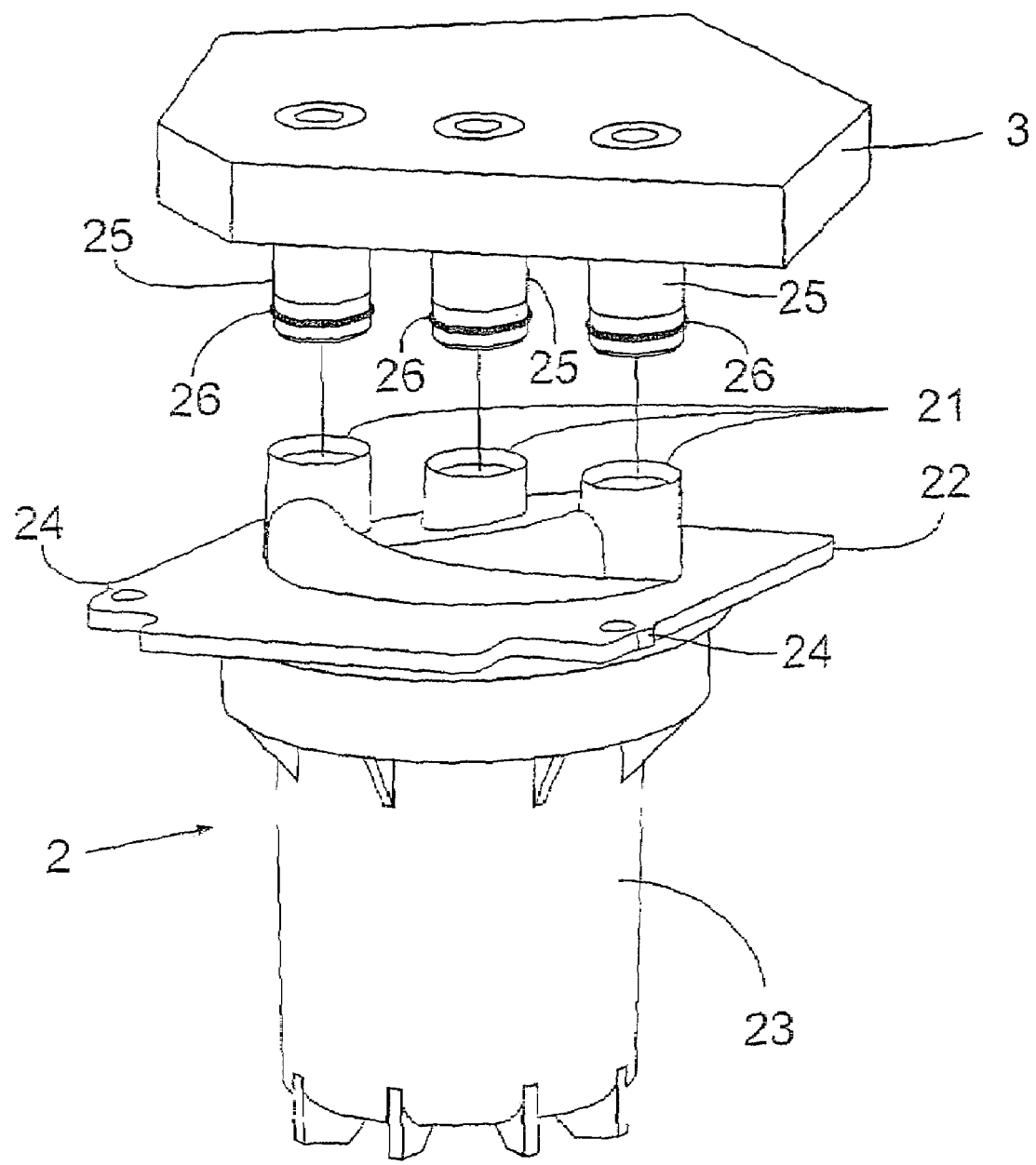
FIG. 2 is a perspective view of a manifold and separation module of the apparatus of FIG. 1.
Figure 5:
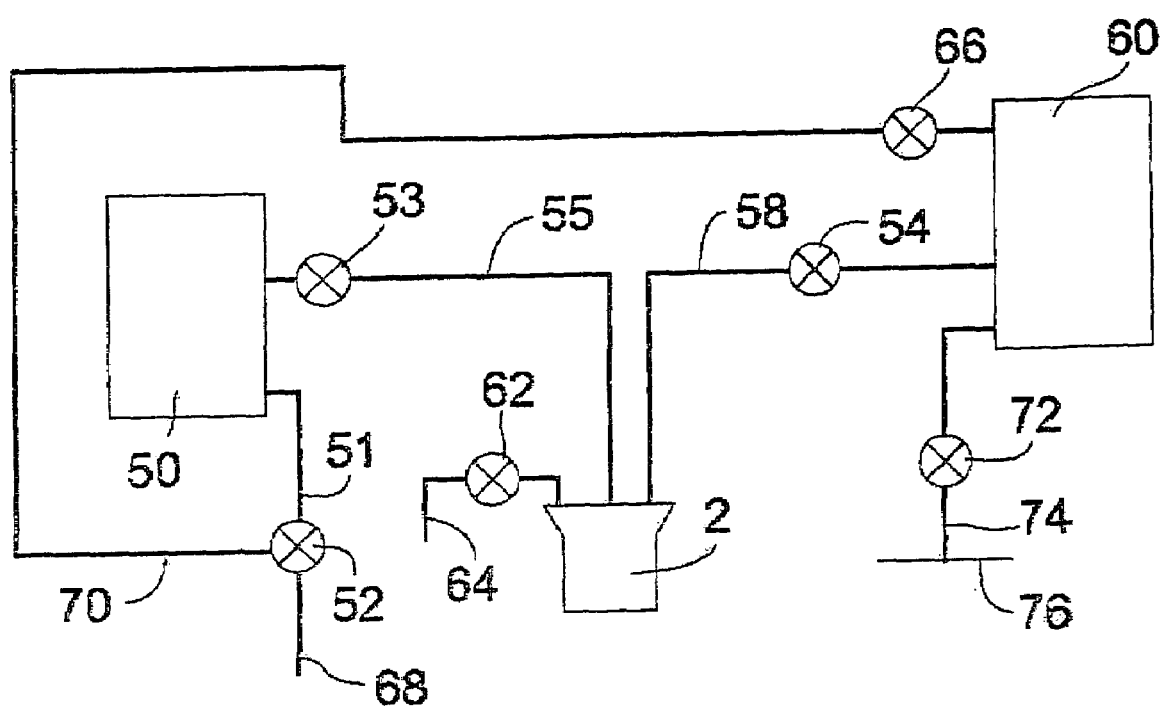
FIG. 5 illustrates a system for dispensing a filtered fluid which utilizes the connector apparatus of this invention.

A fluid dispensing apparatus useful with the connector apparatus of the present invention is shown in FIGS. 1, 2 and 3. FIG. 1 shows a perspective view of photochemical dispense system 1, which includes disposable separation module 2, manifold block 3, pump means housing 4 and module receptor 5. The pump means housing 4 contains a feed pump and a dispensing pump (FIG. 5). Also shown is pump controller 6 which controls the electronic and pneumatic signals directed to and from the pump. The dispense system is similar in design and operation to that disclosed in U.S. Pat. No. 5,262,069. The manifold block 3, which is attached to pump 4, is reusable and designed to matingly accept and retain module 2 as will be described in more detail below.

FIG. 2 is a perspective view of disposable module 2 and a partially sectioned view of the lower portion of manifold 3, showing details of the features that make module 2 capable of connecting to manifold block 3 in a quick-connect fashion. Module 2 has three female fluid connectors 21 on the top end of the module and in fluid communication with the separation element (not shown) within housing 23. The separation element may be of the flat sheet membrane type as described in U.S. Pat. No. 5,262,068, or more preferably may be comprised of hollow fiber membranes of the type described in commonly assigned U.S. Pat. No. 5,762,789, which is incorporated herein by reference. The connectors 21 are spaced apart, parallel and exclusive to each other, so as to enable them to sealingly engage in quick-connect fashion to mating male connectors 25 on manifold block 3. Male connectors 25 are tubular extensions of the fluid passageways of pump 4, and are disposed on the lowermost portion of pump 4. Fluid tight sealing of the mating connector pairs 21 and 25 is accomplished by means of O-rings 26 attached to each of male connectors 25. Flange 22, attached to housing 23, positions the entire module 2 and further provides the module's alignment to manifold block 3 in conjunction with module receptor 5, and as such, assists in the retention of module 2 in sealing engagement to manifold block 3. In this particular embodiment flange 22 includes projections 24 to aid in precisely locating module 2 within the module receptor 5 which is designed to accept the disposable module. The size, shape and location of connectors 21 and flange 22 on module 2 are such as to make module 2 capable of being connected into manifold block 3 in a quick-connect fashion in conjunction with module receptor 5. One of the connectors 21 comprises a fluid inlet to the housing 23. A second connector 21 comprises a fluid outlet from the housing 23. A third connector 21 comprises a vent for removing gas from the housing 23. When venting of gas is not a requirement, a valve or the like in a conduit in fluid communication with the vent connector can be utilized to close fluid flow through the vent connector.

Figure 3A:
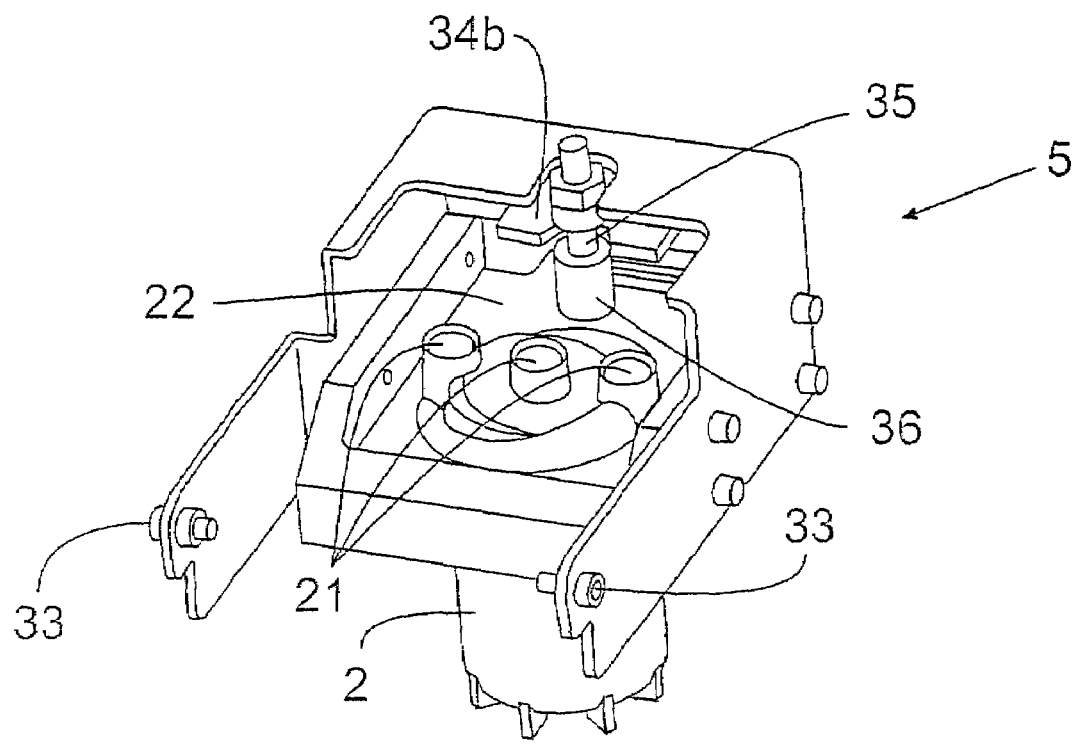
FIGS. 3a and 3b are perspective views of the module of FIG. 2 showing the connections of the separation module with a module receptor.
Figure 3B:
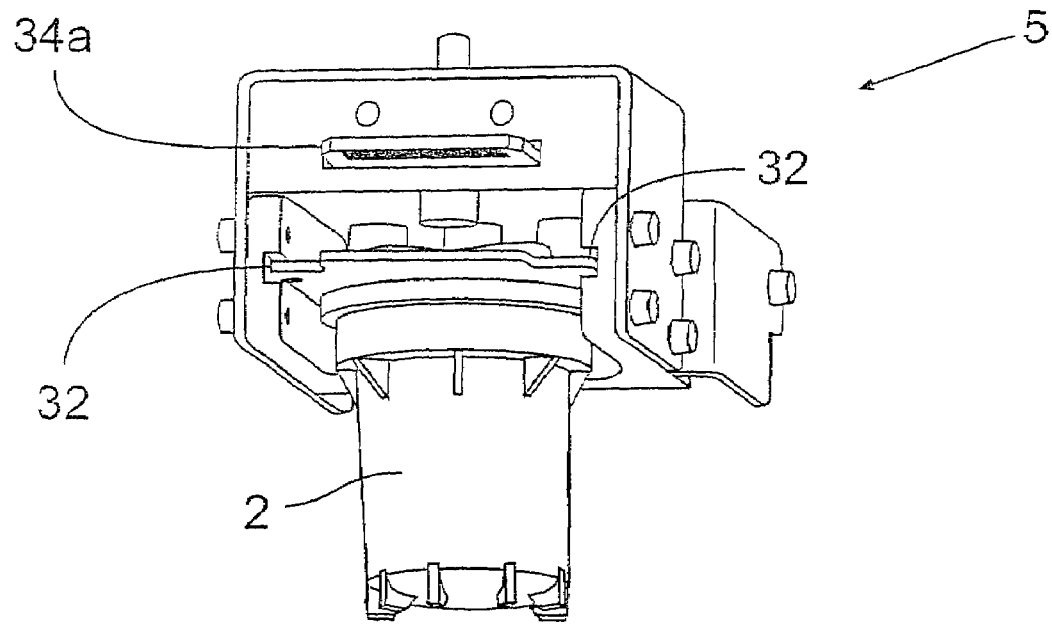

FIGS. 3a and 3b are perspective views of module receptor 5 (shown removed from the pump 4 in these views), which is attached to manifold block 3 showing module 2 positioned within receptor 5. The flange 22 mates with a pair of slots 32 in the body of receptor. The module receptor is attached to the manifold block 3 by hinges 33 which permit a limited range of substantially linear vertical movement which enables the disposable module 2 to be sealingly engaged with, and alternatively disengaged from the male connectors 25 on the manifold block. The module receptor is further attached to the pump 4 by a spring-loaded latch 34, one end of which forms a handle 34a with the opposite end thereof having a semicircular cutout 34b which interlocks with notch 35 on retainer post 36 which is affixed to the manifold block. This arrangement retains the module in sealing engagement with the pump after installation. The latch 34 is able to slide horizontally (i.e., in and out of the plane of FIG. 3b) in order to unlock from the notch on the retainer post thereby allowing the receptor 5 to pivot downwardly on hinges 33 for module replacement. When the mating connectors are disengaged, cutout 34b rests under tension against retainer post 36.

The process of replacing disposable filtration module 2 is accomplished by pulling the handle 34a forward, i.e., in a direction that is substantially perpendicular to the direction of motion required for engaging the female connectors 21 to the male connectors 25. This unlocks latch 34 from retainer post 36 and permits the unhinged end of module receptor 5 to be freed from the pump 4, thereby allowing the entire module 2 to pivot downward on hinges 33 a distance sufficient to move connectors 21 on the module out of sealing engagement with mating connectors 25 on manifold block 3. With the module receptor 5 in this lowered position, module 2 may be removed from the dispense system by sliding it out of the slots 32. A replacement filtration module may then be inserted into the slots followed by pivoting module receptor 5 upward to engage connectors 21 into sealing engagement with mating connectors 25 on the manifold block. When replacement module 2 is in sealing engagement with mating connectors 25, cutout 34b automatically locks into notch 35 thereby retaining the filtration module in sealing engagement to the manifold block during fluid processing conditions.

As seen from the foregoing description of the removal and installation of filtration module 2, the engagement and sealing of mating connections 21 and 25 is effected by a first substantially linear motion which is parallel to the axis defining the body of the connectors. The interlocking of the matable elements and consequent retention of the module is then accomplished without relative motion between the mating connectors by a second substantially linear motion which is perpendicular to the first motion corresponding to engagement and sealing of the connectors. Also, it is clear that the present quick-connect arrangement provides simultaneous connection and sealing of all the connectors on the top of the disposable filtration module 2. However, it is apparent that the benefits so derived apply equally even if the module receptor 5 were swung in a greater arc and even if the mating connectors were engaged somewhat sequentially so long as the engagement and retention is effected rapidly and easily enough to be considered a "quick-connect".

Figure 4A:
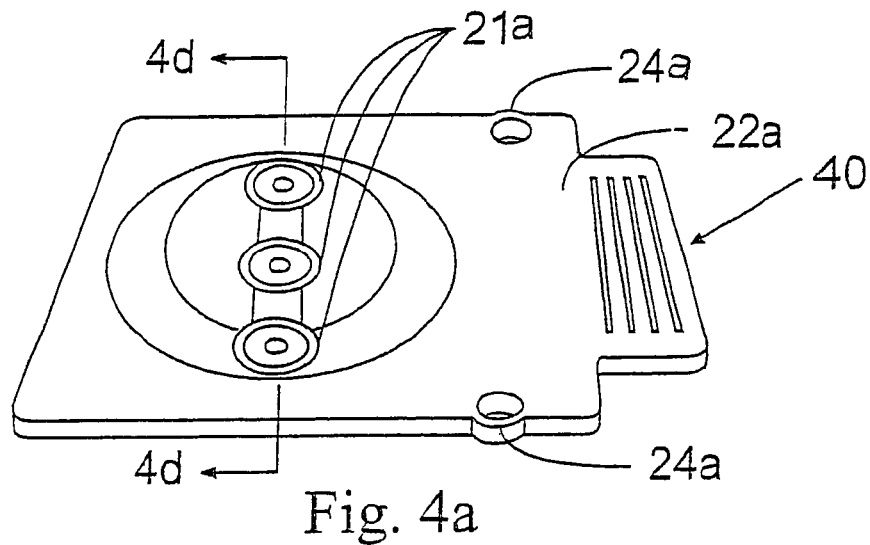
FIGS. 4a, 4b, 4c and 4d show a connector apparatus of this invention.
Figure 4B:
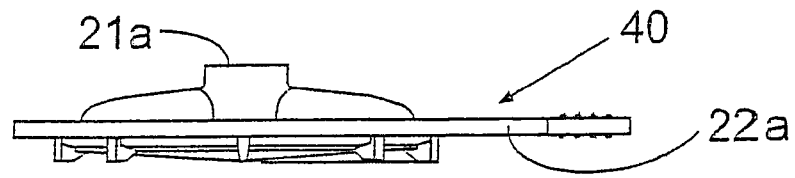
Figure 4C:
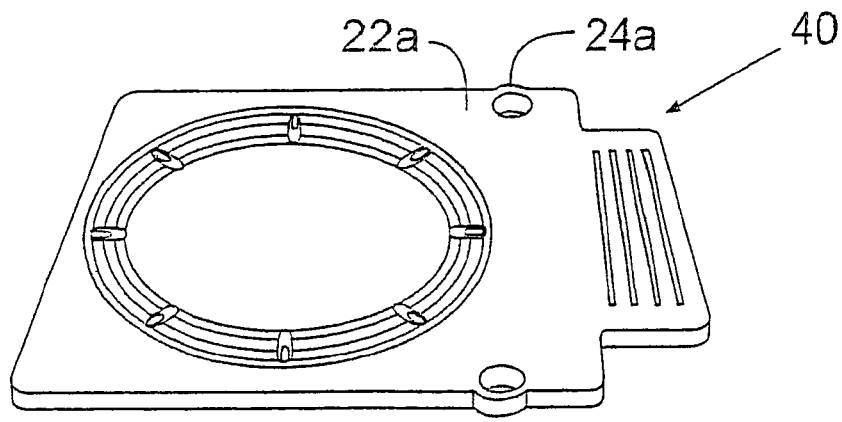

As shown in FIGS. 4a, 4b and 4c, the connector apparatus of this invention 40 includes a flange 22a having the same configuration as flange 22 (FIG. 2) and projections 24a having the same configurations as projections 24. Connectors 21a have the same configuration and spacing as connectors 21 (FIG. 2) and sealingly engage with male connectors 25 as described above with reference to FIG. 2.

Figure 4D:
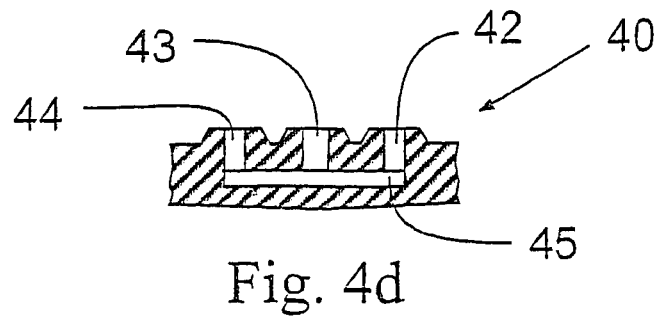

As shown in FIG. 4d, the internal volume of the connector apparatus 42 is significantly less than that of disposable separation module 2. This result is derived from the fact that connector apparatus is a nonworking apparatus and the volume therethrough can be reduced to the volume of conduits 42, 43, 44 and 45.

The operation of the fluid dispensing system including the disposable filtration module 2 will be described with reference to FIG. 5. In a first step, a feed pump 50 draws a liquid into a feed chamber of pump 50 from a storage volume (not shown) through conduit 51 when inlet valve 52 is open. In a second step, isolation valve 53 and barrier valve 54 are open and inlet valve 52 is closed and pump 50 is activated to push liquid through conduit 55 into module 2. Filtered liquid is removed from module 2 through conduit 58 under the influence of pump 50. A dispenser chamber in dispense pump 60 thereby is filled with filtered liquid.

In a third step, barrier valve 54 is closed and vent valve 62 is opened. The feed pump 50 is activated to push a small amount of liquid and any microbubbles therein out of module 2 through conduit 64.

In a fourth step, the barrier valve 54 is closed and the purge valve 66 is opened and dispense pump 60 pushes a small amount of liquid from the dispense chamber in pump 60 and back to the inlet source 68 through conduit 70. This step ensures that the dispense fluid is free of potential microbubbles.

In a fifth step, purge valve 66 is closed and isolate valve 53 is opened and the feed pump 50 and system are allowed to reach ambient pressure. At this point, the system is ready to dispense liquids.

In a sixth step, the outlet valve 72 is opened and the dispenser pump 60 is activated to dispense liquid therefrom through outlet conduit 74 onto wafer 76. In this fluid dispensing process, the feed pump 50 and dispenser pump 60 can be operated independently of each other.

When the dispense system is ready to be purged of the liquid composition being dispensed such as when it is desired to dispense a second liquid composition, module 2 is replaced with connector apparatus 40. The six steps described above for dispensing a liquid then are repeated with a purging liquid in order to purge the entire system of the dispense liquid. It is to be understood that any alternative sequence of steps which assures that purging liquid is passed through the entire system to assure purging of the dispense liquid can be utilized.

After the system is purged, the connector apparatus of this invention is replaced with a fresh module 2 and the above-described dispersing process is repeated to purge the system of the purging fluid and to effect dispensing of a second dispense liquid composition.

Figure 6A:
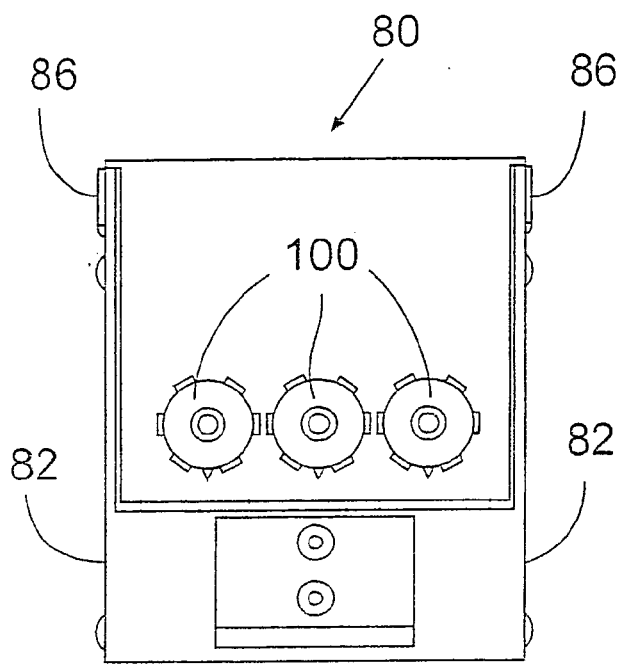
FIGS. 6a, 6b and 6c show a holder for the connector apparatus of this invention.
Figure 6B:
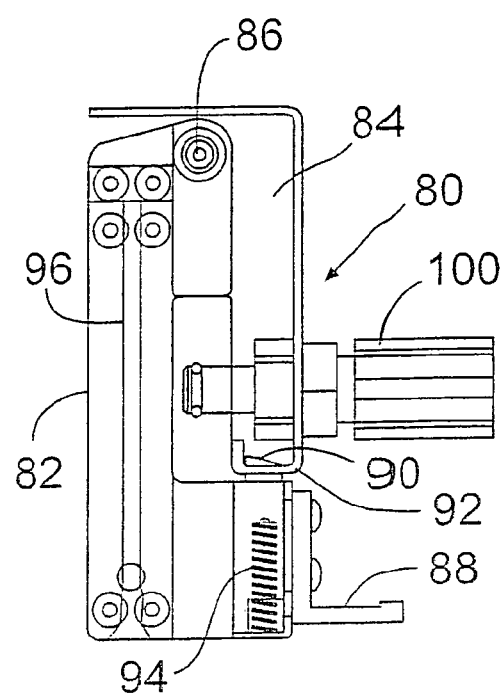
Figure 6C:
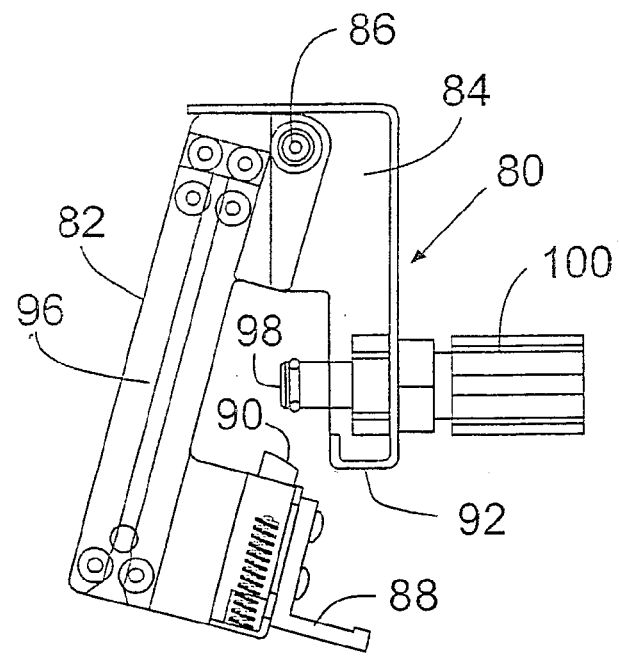

Referring to FIGS. 6a, 6b and 6c, a holder 80 is shown which is configured to secure connector 40 (FIG. 4a) in position to effect fluid communication with a fluid delivery system (not shown). The holder 80 includes two arms 82 pivotally connected to flange 84 at connection 86. The arms 82 are secured in position with respect to the flange 84, as shown in FIG. 6b by spring loaded arm 88 having an arm 90 which is forced into an opening 92 in flange 84 by spring 94.

Release of the arm 90 from the flange 84 is effected by pulling on arm 88 which then permits the arms 82 to be pivoted about connection 86 as shown in FIG. 6c. The connector 40 then is positioned within slots 96 in each arm 82 which accommodates flange 22a (FIG. 4a) so that the connectors 21a are positioned to be in sealing fluid communication with the connectors 98 when arm 90 is locked in hole 92. Each connector 98 then can be placed in fluid communication with conduits (not shown) by means of connectors 100.

We claim:

1. A fluid separation apparatus comprising:
    a separation module;
    a fluid connector member;
        said separation module including:
            a housing;
            a separation element contained within the housing;
            a first set of at least three connectors on one end of the housing and being in fluid communication with the interior thereof, at least two connectors for respectively introducing fluids to and withdrawing fluids from the interior of the housing, and at least one connector that is a gas vent from the housing, said first set of at least three connectors being parallel and spaced apart from one another and being exclusive of one another;
        said fluid connector member including a second set of at least three connectors being positioned and sized and shaped to engage simultaneously in fluid tight engagement with the first set of connectors, wherein the simultaneous fluid tight engagement is effected through a first motion which, during said engagement, is substantially linear and parallel to longitudinal axes of both the first and second sets of connectors.

2. The apparatus of claim 1 further comprising a locking mechanism to lock a module receptor holding the separation module to a manifold assembly comprising the fluid connector member, the locking occurring upon engagement of the first and second sets of connectors.

3. The apparatus of claim 2 wherein a hinge couples to a module receptor holding the separation module, and allows the module receptor to effect the substantially linear first motion during said engagement.

4. The apparatus of claim 1 further comprising a hinge coupled to a module receptor holding the separation module, the hinge facilitating the substantially linear and parallel motion during said engagement.

5. A separation module, comprising:
    a housing;
    a separation element contained within the housing, the separation element dividing the interior of the housing into first and second volumes;
    a first set of at least three connectors on one end of the housing and being in fluid communication with the interior thereof, at least two connectors for respectively introducing fluids to and withdrawing fluids from the interior of the housing, the connector for introducing fluid to the interior of the housing being in fluid communication with the first volume and the connector for withdrawing fluid from the interior of the housing being in fluid communication with the second volume, and at least one connector that is a gas vent from the housing, said first set of at least three connectors being parallel and spaced apart from one another and being exclusive of one another, said first set of connectors configured to operably connect simultaneously to a second set of at least three connectors on a fluid connector member by forming a fluid tight engagement with the second set of at least three connectors, wherein the simultaneous fluid tight engagement is effected through a first motion which, during said engagement, is substantially linear and parallel to longitudinal axes of both the first and second sets of connectors.

6. The separation module of claim 5 wherein the fluid tight engagement is effected through a first motion which, during said engagement, is substantially linear and parallel to longitudinal axes of both the first and second sets of connectors.

7. A disposable fluid separation module, comprising:
    a housing having a first end and a second end;
    a separation element within the housing, the separation element dividing the interior of the housing into first and second volumes; and
    a first set of at least three connectors on a first end of the housing, the at least three connectors being spaced apart and parallel, the at least three connectors comprising:
        a fluid inlet to the housing, the fluid inlet being in fluid communication with the first volume;
        a fluid outlet from the housing, the fluid outlet being in fluid communication with the second volume; and
        a gas vent from the housing; wherein the first set of at least three connectors is configured to operably connect simultaneously to a second set of at least three connectors on a fluid connector member by forming a fluid tight engagement with the second set of at least three connectors, wherein the simultaneous fluid tight engagement is affected through a first motion which, during said engagement, is substantially linear and parallel to longitudinal axes of both the first and second sets of connectors.

8. The disposable fluid separation module of claim 7, comprising: at least one projection on the housing configured to mate with at least one corresponding slot on a module receptor to facilitate alignment of the connectors with corresponding connectors of a fluid connector member.

9. The disposable fluid separation module of claim 7, wherein the separation element separates unwanted components from a semiconductor process fluid.

10. The disposable fluid separation module of claim 9, wherein the semiconductor process fluid comprises at least one of a photochemical, a primer, an adhesion promoter, a photoresist, an edge bead remover, an antireflective coating, a developer, and a dielectric.

11. The disposable fluid separation module of claim 7, wherein the separation element comprises a flat sheet membrane.

12. The disposable fluid separation module of claim 7, wherein the separation element comprises a hollow fiber membrane.

13. The disposable fluid separation module of claim 7, wherein the separation element is permanently secured within the housing.

14. A fluid separation apparatus according to claim 1, wherein the at least one connector that is a gas vent is capable of automatically venting the gas.

15. A separation module according to claim 5, wherein the at least one connector that is a gas vent is capable of automatically venting the gas.

16. A disposable fluid separation module according to claim 7, wherein the gas vent is capable of automatically venting the gas.

17. A fluid separation apparatus according to claim 1, further comprising a pump interfaced to the separation module via the fluid connector member.

* * * * *

UNITED STATES PATENT AND TRADEMARK OFFICE
CERTIFICATE OF CORRECTION

| | | |
|---|---|---|
| PATENT NO. | : 7,037,424 B2 | Page 1 of 1 |
| APPLICATION NO. | : 11/045726 | |
| DATED | : May 2, 2006 | |
| INVENTOR(S) | : J. Karl Niermeyer et al. | |

It is certified that error appears in the above-identified patent and that said Letters Patent is hereby corrected as shown below:

<u>Column 8</u>   Line 27-30

Please,
Delete claim 6

Signed and Sealed this

Twenty-second Day of August, 2006

JON W. DUDAS
*Director of the United States Patent and Trademark Office*